(12) United States Patent
Bhatia

(10) Patent No.: US 8,527,287 B1
(45) Date of Patent: Sep. 3, 2013

(54) METHOD AND SYSTEM FOR ATTENDING A MEETING

(75) Inventor: Sandeep Bhatia, Sunnyvale, CA (US)

(73) Assignee: Intuit Inc., Mountain View, CA (US)

( * ) Notice: Subject to any disclaimer, the term of this patent is extended or adjusted under 35 U.S.C. 154(b) by 756 days.

(21) Appl. No.: 12/247,804

(22) Filed: Oct. 8, 2008

(51) Int. Cl.
*G06Q 10/00* (2006.01)

(52) U.S. Cl.
USPC .............. 705/1.1; 705/300; 705/301

(58) Field of Classification Search
USPC .......................... 705/1.1, 300–301
See application file for complete search history.

(56) References Cited

U.S. PATENT DOCUMENTS

| | | | | |
|---|---|---|---|---|
| 3,806,804 | A * | 4/1974 | Mills et al. | 455/509 |
| 6,363,352 | B1 * | 3/2002 | Dailey et al. | 705/9 |
| 7,818,420 | B1 * | 10/2010 | Taylor | 709/224 |
| 2004/0168133 | A1 * | 8/2004 | Wynn et al. | 715/541 |
| 2005/0018827 | A1 * | 1/2005 | Himmel et al. | 379/202.01 |
| 2008/0167937 | A1 * | 7/2008 | Coughlin et al. | 705/9 |

* cited by examiner

*Primary Examiner* — Candice D Wilson
(74) *Attorney, Agent, or Firm* — Osha Liang LLP

(57) ABSTRACT

The invention relates to a method for attending a meeting. The method involves determining the presence of a meeting notice for a meeting in meeting software, where the meeting notice comprises a start time, a end time, a name of an attendee, and information to connect to the meeting. The method also involves obtaining information about the meeting from the meeting notice to populate a meeting template, determining that the meeting is a not-in-person meeting, and populating the meeting template to obtain a meeting record for the meeting. The method also involves connecting over a voice communication channel to the meeting at the start time using the information in the meeting record for the meeting and terminating the meeting at the end time of the meeting.

19 Claims, 9 Drawing Sheets

| | |
|---|---|
| Meeting Date: 502 | July 30, 2008 Wednesday |
| Meeting Start Time: 504 | 9:30 a.m. Central Prevailing Time |
| Meeting End Time: 506 | 10:00 a.m. Central Prevailing Time |
| Subject of Meeting: 508 | Plumbing repairs |
| Meeting Originator: 510 | Tom Tutone Gem Plumbing |
| Meeting Call-in Number: 512 | 555-867-5309 |
| Meeting Access Code: 514 | 53669 |
| Reminder: 516 | 5 minutes prior to start of meeting |
| Voice communication channel: 518 | 123-456-7890 |
| Stated name required: 520 | ☐ Yes  ☐ No  ☒ Unknown |

METHOD AND SYSTEM FOR ATTENDING A MEETING

BACKGROUND

Conference calls and other not-in-person meetings are becoming more common. Often, some type of electronic calendar is used to schedule these meetings and capture the relevant information about the meeting and how to attend it. For example, a scheduled conference call, with all the relevant information about the meeting and how to connect to it, may be entered into Microsoft® Outlook (Microsoft is a registered trademark of Microsoft Corporation, Redmond, Wash.) and reside in its calendar.

However, connecting to these meetings remains a manual process. To attend a meeting, the attendee must have the information about the meeting in hand and manually enter the information required, in the proper order, to be able to connect to that meeting. For example, an attendee to a business conference call must either print out the information (e.g., dial-in number and access code) from an electronic meeting notice, write down the information, or bring the device with the electronic meeting notice to the room from which the call is to be made. Lacking the ability to connect to these meetings automatically often results in inefficiency and inconvenience for the attendees.

SUMMARY

In general, in one aspect, the invention relates to a method for attending a meeting. The method involves determining the presence of a first meeting notice for a first meeting in meeting software, wherein the first meeting notice comprises a first start time, a first end time, a name of an attendee, and information to connect to the first meeting, and obtaining information about the first meeting from the first meeting notice to populate a meeting template. The method further involves determining that the first meeting is a not-in-person meeting, populating the meeting template to obtain a first meeting record for the first meeting, connecting over a voice communication channel to the first meeting at the first start time using the information in the first meeting record for the first meeting, and terminating the first meeting at the first end time of the first meeting.

In general, in one aspect, the invention relates to a computer readable medium comprising computer program code embodied therein for attending a meeting. The computer program code comprises instructions to determine the presence of a first meeting notice for a first meeting in meeting software, wherein the first meeting notice comprises a first start time, a first end time, a name of an attendee, and information to connect to the first meeting, and obtain information about the first meeting from the first meeting notice to populate a meeting template. The computer program code comprises further instructions to determine that the first meeting is a not-in-person meeting, populate the meeting template to obtain a first meeting record for the first meeting, connect over a voice communication channel to the first meeting at the first start time using the information in the first meeting record for the first meeting, and terminate the first meeting at the first end time of the first meeting.

In general, in one aspect, the invention relates to a system for automatically connecting to a meeting. The system includes meeting software configured to send and receive meeting notices. The system further includes an automated meeting attendance system operatively connected to the meeting software and configured to determine presence of a first meeting notice for a first meeting in meeting software, wherein the first meeting notice comprises a first start time, a first end time, a name of an attendee, and information to connect to the first meeting, and obtain information about the first meeting from the first meeting notice to populate a first meeting template, determine that the first meeting is a not-in-person meeting, populate the meeting template to obtain a first meeting record for the first meeting, connect over a voice communication channel to the first meeting at the first start time using the information in the first meeting record for the first meeting, and terminate the first meeting at the first end time.

Other aspects of the invention will be apparent from the following description and the appended claims.

BRIEF DESCRIPTION OF DRAWINGS

FIG. 5 shows an example of the meeting template in accordance with one or more embodiments of the invention.

DETAILED DESCRIPTION

Figure 1:
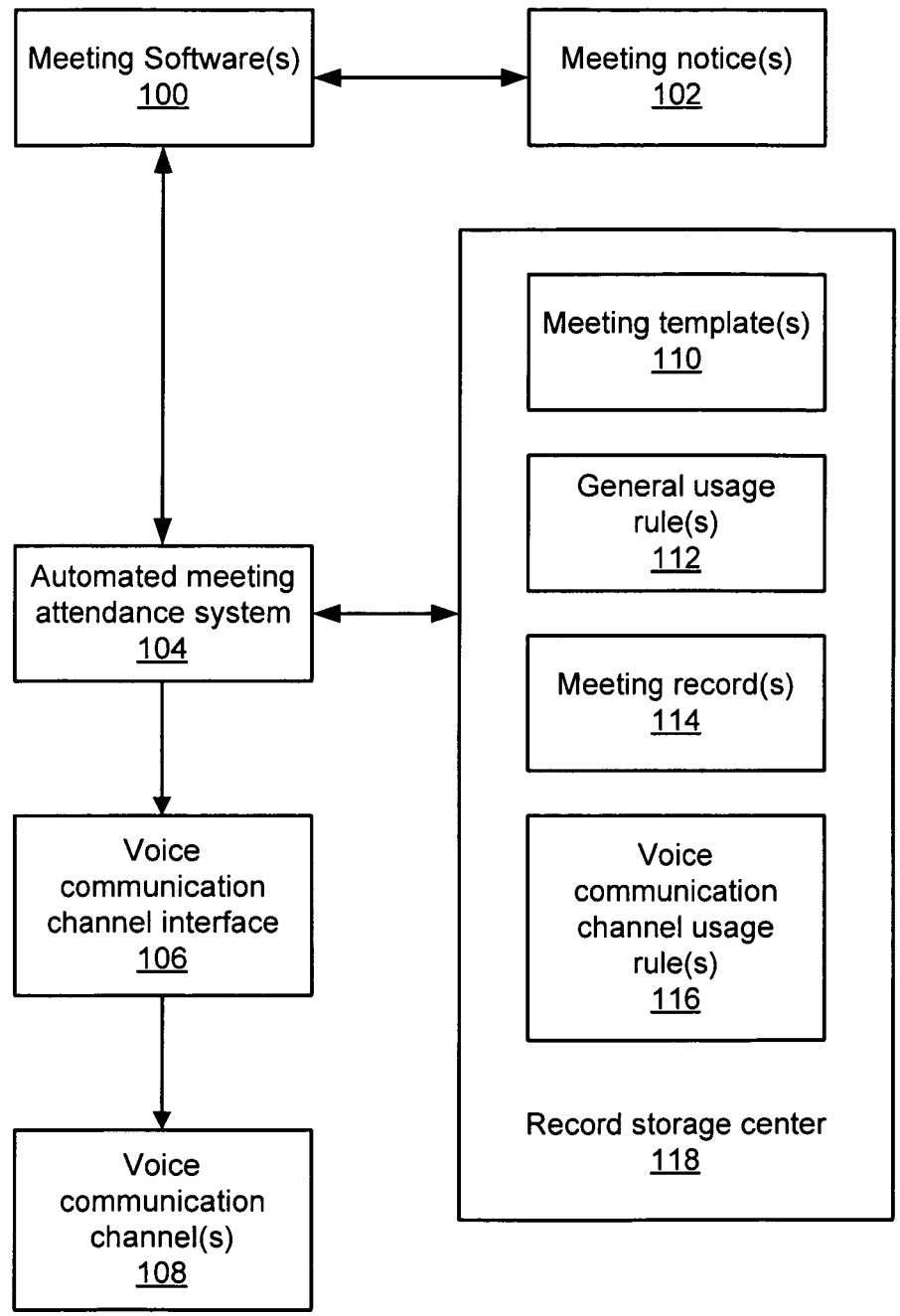
FIG. 1 shows a schematic diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system to attend a meeting. More specifically, embodiments of the invention provide a method and system for automatically connecting to a not-in-person meeting with respect to the attendance requirement of the attendee.

FIG. 1 shows a system for attending a meeting in accordance with one or more embodiments of the invention. As shown in FIG. 1, the system includes a meeting notice (102), meeting software (100), an automated meeting attendance system (104) (hereafter "the System"), a voice communication channel interface (106), and one or more voice communication channels (108). The System includes data interface with a record storage center (118), which includes a meeting template (110), one or more general usage rules (112), one or more meeting records (114), and one or more voice communication channel user rules (116). Each of these components is described below. One of ordinary skill in the art will appreciate that embodiments of the invention are not limited to the configuration shown in FIG. 1.

The meeting software (100) is a form of electronic or computerized calendar system configured to track appointments and relevant information regarding those appointments. Examples of meeting software (100) include, but are not limited to, Microsoft® Outlook, Lotus Notes® (Lotus Notes is a registered trademark of Lotus Development Corporation, Cambridge, Mass.), or GoldMine® (Goldmine, is a registered trademark of Frontrange Solutions USA, Inc., Pleasanton, Calif.). In one or more embodiments of the invention, the meeting software (100) is configured to generate a meeting notice (102) for each meeting entered into the meeting software (100). In one or more embodiments of the invention, the meeting software (100) may communicate all or a portion of the data in the meeting notices (102) to the System (discussed below).

The meeting notice (102) includes information about each meeting that is entered into the meeting software (100). Such information may include, but is not limited to, a meeting date, a meeting start time, a meeting end time, a subject of the meeting, a meeting originator, data to connect to the meeting, and a meeting access code.

The System is configured to receive the information included in the meeting notice (102) from the meeting software (100) and extracts all or a portion of the information about the meeting from the meeting notice (102). The System also communicates with, and is operatively connected to, the record storage center (118). In one embodiment of the invention, the record storage center (118) is a persistent storage device (or set of devices) and is configured to store the meeting template (110), the general usage rule(s) (112), the meeting record(s) (114), and voice communication channel user rule(s) (116).

In one or more embodiments of the invention, the meeting template (110) includes a number of fields configured to receive information about a meeting from the System. Examples of the fields of the meeting template (110) include, but are not limited to, the meeting date, the meeting start time, the meeting end time, the subject of the meeting, the meeting originator, the data to connect to the meeting, the reminder, the voice communication channel, and whether the name of the attendee needs to be stated at the start of the meeting. The meeting information received by the meeting template (110), through the System, may come from sources including, but not limited to, a meeting notice (102) through meeting software (100), general usage rule(s) (112), voice communication channel usage rules (116), other sources, or a combination thereof. Once the fields of the meeting template (110) have been filled with information about a meeting, the information may be converted into a meeting record (114). An example of the meeting template (110) is described in more detail below in relation to FIG. 5.

In one or more embodiments of the invention, the general usage rule(s) (112) direct the System to follow certain predetermined guidelines, defined by the attendee, related to a meeting. Examples of general usage rules (112) include, but are not limited to, (i) specifying which of the voice communication channels to use for a specific meeting, (ii) specifying a default voice communication channel to use when no explicit voice communication channel is specified; (iii) specifying a back-up voice communication channel to use when the initially selected/specified voice communication channel is not functioning properly; (iv) specifying (i), (ii), and/or (iii) based on the current physical location of the attendee (e.g., United States, Europe, East Asia, etc.); (v) specifying when to use a voice recording of the attendee's name (if there are multiple voice recordings of the attendee's name then the usage rules may specify when to use which recording; (vi) specifying the attendee's continuous meeting option preference (discussed below); (vii) notifying the attendee prior to the start of a meeting; (viii) prompting the attendee prior to initiating meeting attendance; and (ix) setting a continuous meeting option. These general usage rules (112) may be based on the time of day, the day of the week, some other criteria, or any combination thereof. Each of the general usage rules may also have their own general usage rules. For example, in prompting the attendee prior to initiation meeting attendance, further general usage rules (112) may include the selection of a period of time prior to the start time of the meeting that the attendee is prompted and a choice to delay the connection to the meeting. If the attendee wishes to delay the connection to a meeting, the System may prompt him to declare how long to delay the connection to the meeting.

The general usage rules (112) may be changed at any time by the attendee, and each time that the general usage rules (112) are changed, the System is configured to update the meeting record(s) (114) in the record storage center (118) for meetings that have not yet occurred, incorporating the revised general usage rules (112). For example, if the attendee modifies a general user rule (112) to be notified ten minutes prior to the start of a meeting rather than one minute, then the attendee receives a meeting notice at 9:50 a.m. (as opposed to 9:59 a.m.) the following day, ten minutes before a 10:00 a.m. conference call he has scheduled. Creating the usage rules (112) is further described below in relation to FIG. 2.

In one embodiment of the invention, the meeting record (114) is configured to contain information about a meeting after receiving the information from the meeting template (110). A meeting record may be created, stored, retrieved, and modified by the attendee or by the System. A meeting record may be created for each meeting in the automated meeting attendance system (110). Creating a meeting record (114) is further described below in relation to FIG. 3.

In one embodiment of the invention, the voice communication channel usage rule(s) (116) direct the System as to which voice communication channel (108) to utilize for a particular meeting. The attendee may designate more than one voice communication channel (108), where different voice communication channels (108) can be utilized for different meetings. After the attendee initially establishes the voice communication channel usage rule(s) (116), he may modify the voice communication channel usage rule(s) (116) at any time. These voice communication channel usage rule(s) (116) may be based on the time of day, the day of the week, some other criteria, or any combination thereof. For example, the attendee may set the voice communication channel usage rule(s) (116) such that a certain voice communication channel is only used for meetings that occur on Fridays or for meetings that occur after 6:00 p.m. Designating the voice communication channel(s) (108) and associated voice communication channel usage rule(s) (116) is further described below in relation to FIG. 2.

Continuing with the discussion on FIG. 1, in one or more embodiments of the invention, the voice communication channel interface (106) is configured to enable the System to interact with one or more voice communication channels (108).

Each voice communication channel (108) is configured to receive commands from the System via the voice communication channel interface (106) to initiate a connection to a meeting, enable communication during a meeting, and disconnect from the meeting according to the instructions delivered by the System. In one or more embodiments of the invention, the attendee may configure the System to interface with multiple voice communication channels (108). The attendee may add or delete voice communication channels (108) as needed.

In one embodiment of the invention, the voice communication channel is any communication channel that is capable of providing voice communication. Examples of voice communication channels include, but are not limited to, plain-old telephone service (POTS), a voice over internet protocol (VOIP) channel, mobile communication channels using various mobile phone standards (e.g., Global System for Mobile Communication (GSM), General Packet Radio Service (GPRS), third-generation (3G) phone standards, forth-generation (4G), etc.), or any other voice communication channel implemented using a wired connection, a wireless connection or any combination thereof.

In one or more embodiments of the invention, all of the components shown in FIG. 1 are implemented on a personal digital assistance such as a smart phone. In such cases, an attendee may schedule a not-in person-meeting using meeting software on the PDA. The System executing on the PDA may then perform one or more steps described below in FIGS. 2-4 using, among other components, using one or more voice communications on the PDA (e.g., the PDA may include functionality to communicate over GSM, GPRS, 3G, and a wireless local area network).

Figure 2:
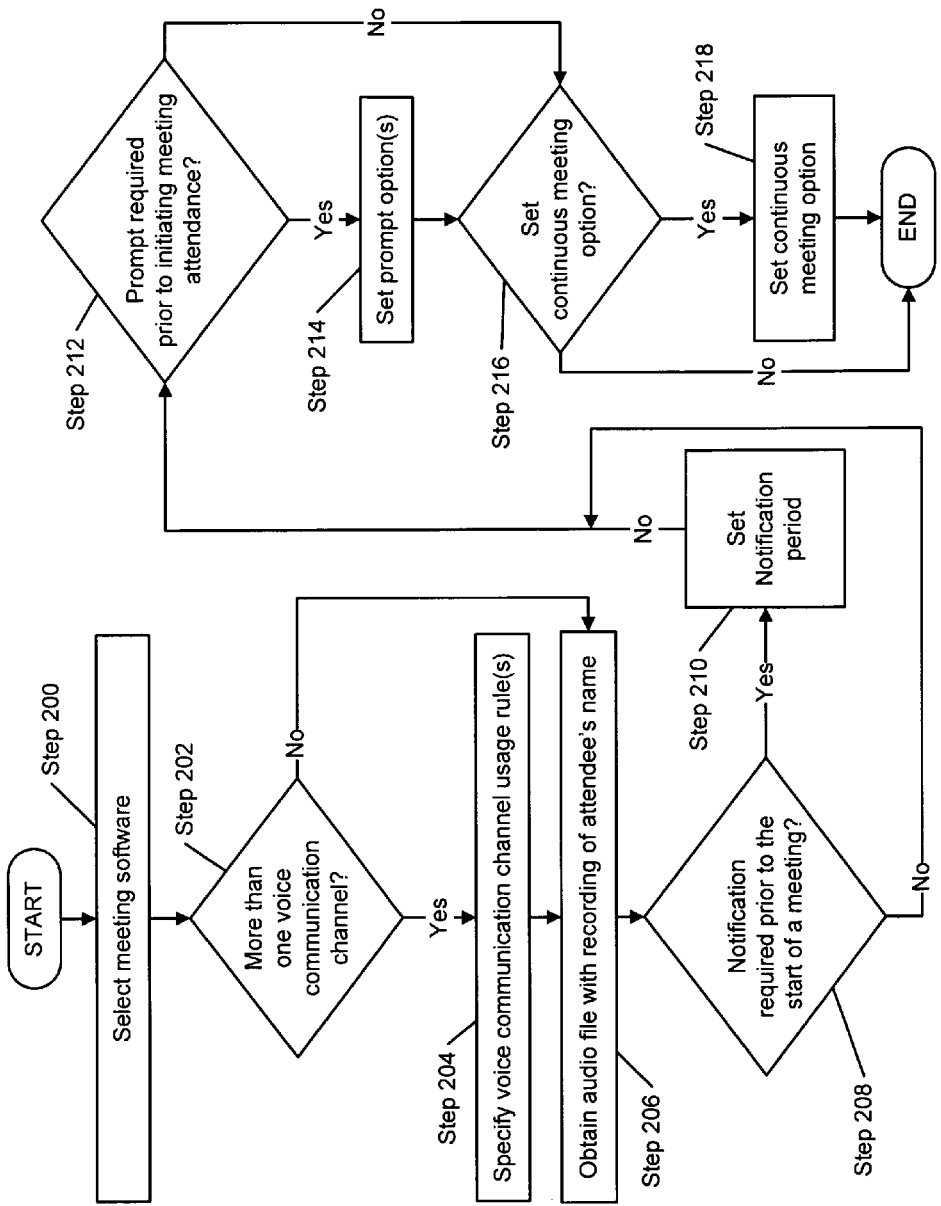
FIG. 2 shows a flowchart for establishing the general usage rules and the voice communication channel usage rules in accordance with one or more embodiments of the invention.
Figure 3:
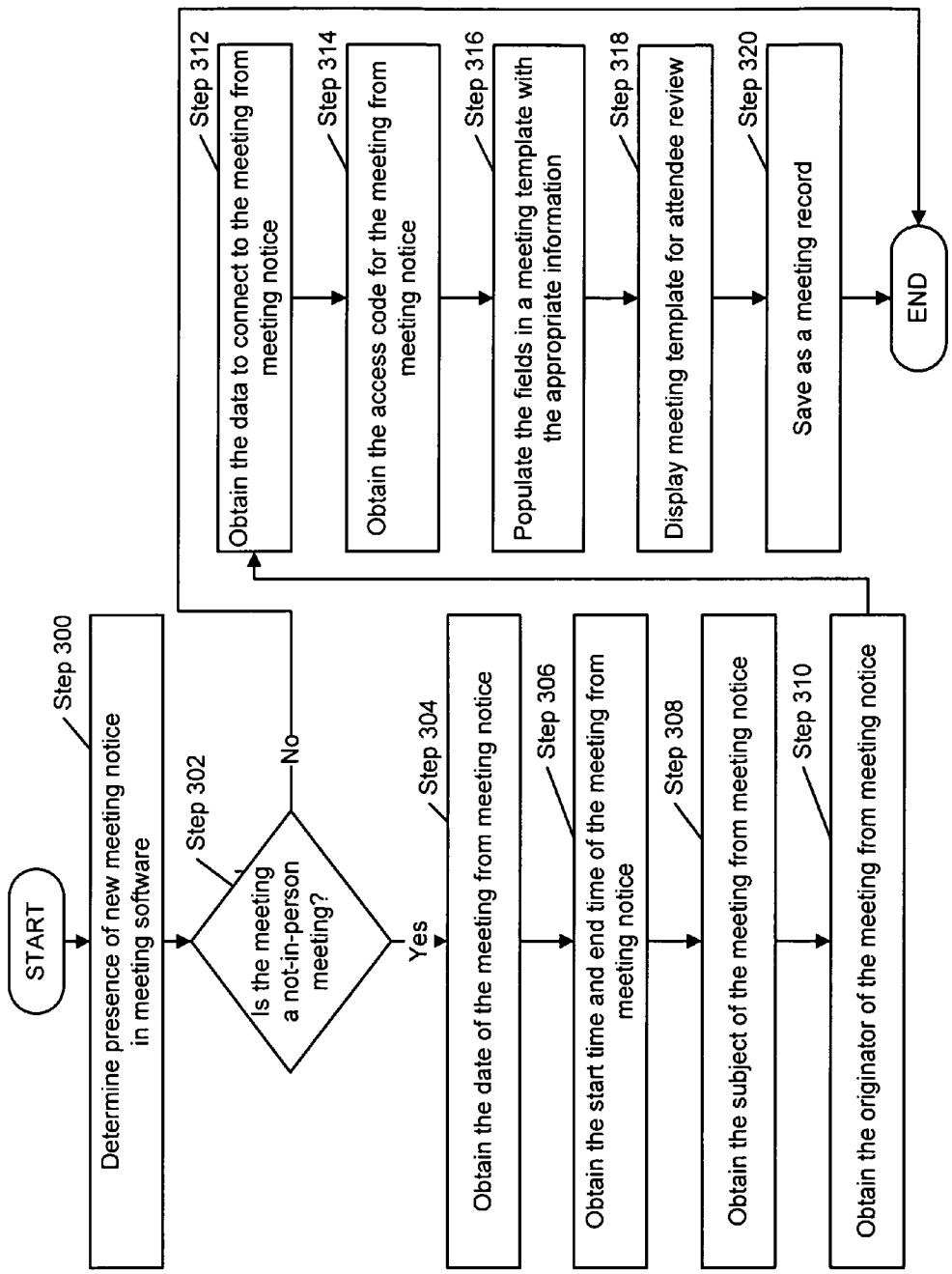
FIG. 3 shows a flowchart for creating the meeting record for a meeting in accordance with one or more embodiments of the invention.
Figure 4:
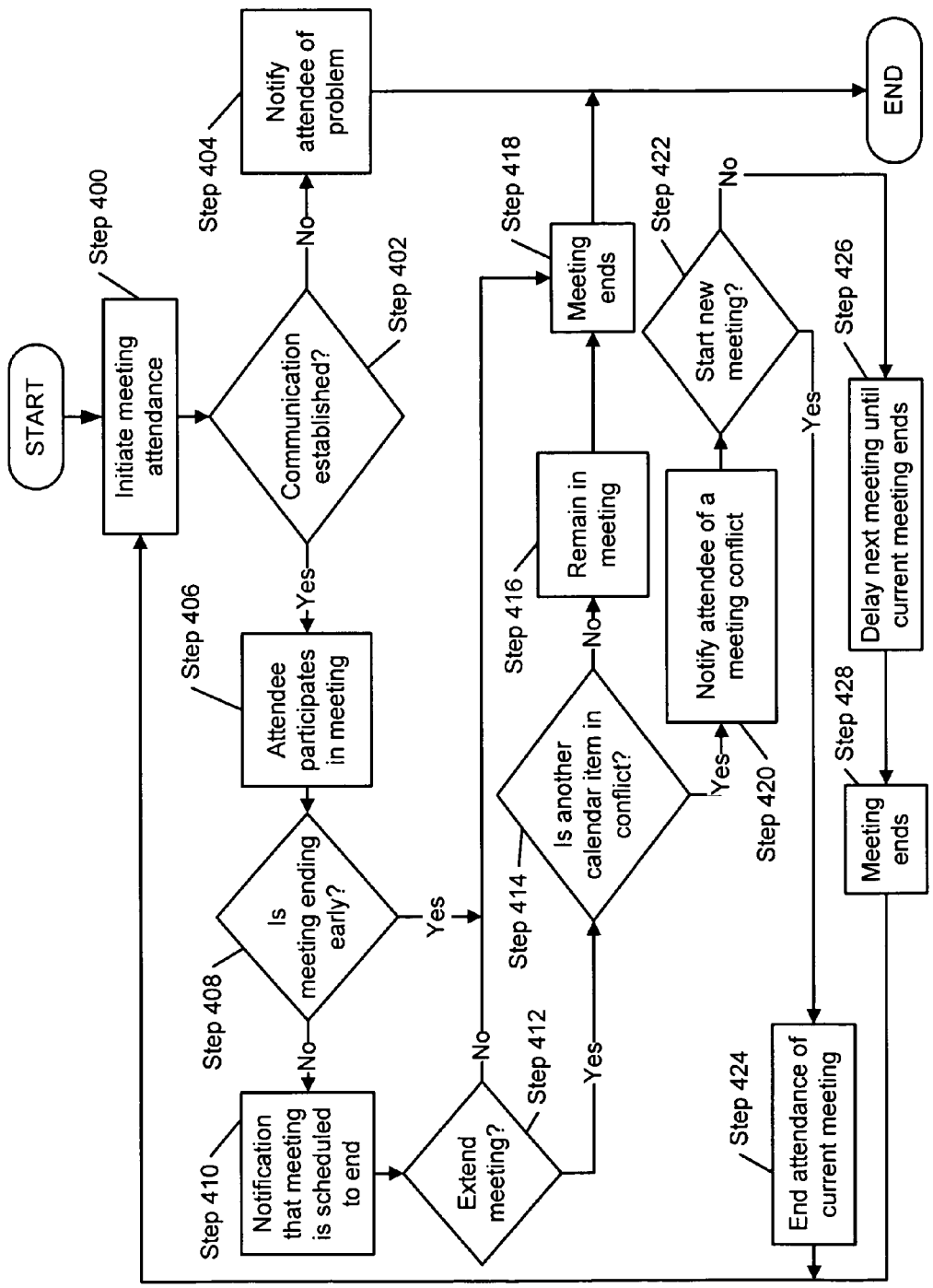
FIG. 4 shows a flowchart for connecting to a meeting and managing conflicts that arise during the meeting in accordance with one or more embodiments of the invention.

FIGS. 2-4 show flowcharts for establishing the general usage rule(s) (112) and the voice communication channel usage rule(s) (116), for creating a meeting record (114), and for connecting to a meeting and managing conflicts that arise during the meeting, each in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. Further, in one or more of the embodiments of the invention, one or more of the steps described below may be omitted, repeated, and/or performed in a different order. In addition, a person of ordinary skill in the art will appreciate that other steps, omitted in FIGS. 2-4, may be included in one or more of these flowcharts. Accordingly, the specific arrangement of steps shown in FIGS. 2-4 should not be construed as limiting the scope of the invention.

FIG. 2 shows a method for establishing general usage rules (112) and voice communication channel usage rules (116) in accordance with one or more embodiments of the invention. The general usage rules (112) and the voice communication channel usage rules (116) allow the attendee to dictate how the System handles certain meetings that are scheduled to occur as well as conflicts that may arise between scheduled meetings.

In Step 200, the attendee selects the meeting software (100) that sends meeting notices (102) to the System. The attendee may select multiple meeting software packages (100) if more than one is used by the attendee. Examples of meeting software (100) include, but are not limited to, Microsoft® Outlook, Lotus Notes®, and Goldmine®.

In Step 202, a determination is made as to whether there are more than one voice communication channel (108) to be used for future meetings. If there is only one voice communication channel, then the process proceeds to Step 206. If there is more than one voice communication channel (108), then the process proceeds to Step 204. In Step 204, the attendee specifies the voice communication channel usage rules (116). The voice communication channel usage rules (116) allow the attendee to define which of the voice communication channels (108) is to be used for a given meeting.

In Step 206, the attendee is prompted to record his name. This recording is played if a meeting host asks for the attendee's name to be announced upon entering the meeting. If the attendee does not record his name during this Step 206, the System creates a digital recording of the attendee's name.

In Step 208, the attendee decides whether to be notified prior to the start time of a meeting. The purpose of the notification is remind the attendee of a pending meeting. If the attendee wants to be notified prior to the start time of a meeting, the process proceeds to Step 210. If the attendee does not want to be notified prior to the start time of a meeting, the process proceeds to Step 212.

In Step 210, upon deciding to be notified prior to the start of a meeting, the attendee indicates how far in advance of the meeting start time he would like to receive notification. The attendee may elect to be notified weeks, days, hours, or minutes prior to the start of a meeting.

In Step 212, the attendee decides whether to be prompted to connect to a meeting prior to attending the meeting. If the attendee wants to be prompted to connect prior to the start of a meeting, the process proceeds to Step 214. If the attendee does not want to be prompted to connect prior to the start of a meeting, the process proceeds to Step 216.

In Step 214, the attendee sets options of how he is prompted before connecting to a meeting. An example of the System prompting the attendee to initiate connecting to a meeting is described in more detail below in relation to FIG. 7A, and an example of the attendee delaying connection to a meeting is described in more detail below in relation to FIG. 7B.

In Step 216, the attendee decides whether to set the continuous meeting option. If the attendee sets the continuous meeting option, the process proceeds to Step 218. If the attendee does not set the continuous meeting option, there are no remaining steps in setting the general usage rules (112) or the voice communication channel usage rules (116), and the process for entering general usage rules (112) and voice communication channel usage rules (116) ends.

In Step 218, the attendee sets the continuous meeting option. In one or more embodiments of the invention, this option allows the System to prompt the attendee that a current meeting is about to run over its scheduled time, and the attendee may extend the meeting or let the meeting terminate at its originally scheduled end time. In addition, the system notifies the attendee if any conflicts exist with a subsequent meeting if the current meeting is extended and how the attendee would prefer to handle the conflict. In the event of a conflict, the attendee may choose between extending the end time of the current meeting and starting the subsequent meeting when the current meeting finishes, or terminating the current meeting at the originally scheduled time and thereafter connecting to the subsequent meeting. Once this Step 218 is finished, there are no remaining steps in setting the general usage rules (112) and the and voice communication channel usage rules (116), and the method for establishing usage rules is complete, ending the process.

FIG. 3 shows a method for creating a meeting record (114) for a meeting in accordance with one or more embodiments of the invention. In one embodiment of the invention, the System obtains the appropriate data using programmed search techniques. For example, to find a call-in number for a conference call, the System may search the meeting notice (102) for a seven-digit or a ten-digit phone number, with or without an area code in parentheses and, upon finding such a number, recognize it as the call-in number. If more than one such number exists, the System may use other methods (e.g., looking for a phone number next to the words "dial in number" or "call in number") to determine the call-in number, as distinguished from another phone number, such as the phone number of the person originating the meeting notice (102).

In Step 300, the System receives a new meeting notice (102) from the meeting software (100). The new meeting notice (102) may be for a new meeting, or it may be a modification of an existing meeting. The process then proceeds to Step 302, where the System determines whether the new meeting notice is for a not-in-person meeting with respect to the attendance requirement of the attendee. If the new meeting notice is for a not-in-person meeting, then the process proceeds to Step 304. If the new meeting notice (102) is for an in-person meeting, then the process ends, and a meeting record (114) is not created for the in-person meeting.

In Step 304, the System obtains the date of the meeting from the meeting notice (102). In Step 306, the System obtains the start time and end time of the meeting from the meeting notice (102). In Step 308, the System obtains the subject of the meeting from the meeting notice (102). In Step 310, the System obtains the originator of the meeting from the meeting notice (102).

In Step 312, the System obtains the data to connect to the meeting from the meeting notice (102). This data may come in a variety of forms, such as a call-in number for a conference call, a link for a web meeting, or a link for a video conference. In Step 314, the System obtains the access code for the meeting from the meeting notice (102), if such an access code is required for the meeting. In Step 316, the System populates fields in the meeting template (110) with the appropriate information received in Steps 304-314. An example of a meeting template (110) for a meeting is described in more detail below in relation to FIG. 5.

In Step 318, the System displays the meeting template (110) for the meeting for the attendee to review. If the attendee is aware that any of the information in the meeting template (110) is incorrect, the attendee may change the incorrect information either in the System or in the meeting software (100). Any revised meeting notice (102) is sent to the System after revisions have been made. In Step 320, once the review by the attendee in Step 318 is complete, the System converts the information in the meeting template (110) into a meeting record (114) and saves the meeting record (112) to the record storage center (118).

FIG. 4 shows a method for connecting to a meeting and managing conflicts that arise during the meeting in accordance with one or more embodiments of the invention.

In Step 400, the System initiates meeting attendance using the meeting record (114). In Step 402, the System determines whether communication with the meeting has been established. If communication has been established with the meeting, then the method proceeds to Step 406. If communication has not been established with the meeting, then the process proceeds to Step 404.

In Step 404, the System notifies the attendee that communication has not been established with the meeting. An example of this notification is described in more detail below in relation to FIG. 6. Once this notification is delivered to the attendee, the System waits until it receives another meeting notice or further instruction from the attendee, or a previously scheduled meeting is about to begin. In one or more embodiments of the invention, the System may automatically reattempt to connect to a meeting before notifying the attendee of a problem. Alternatively, the System may notify the attendee that the System was unable to connect to the meeting because of a busy signal or a similar obstacle to connect to the meeting, and the System may automatically make an additional attempt to connect to the meeting after an increment of time.

In Step 406, the attendee participates in the meeting after communication is established by the System. In Step 408, the attendee determines if the meeting is going to end early (e.g., because he wants to leave the meeting before its scheduled end time or because the meeting has ended prior to its scheduled end time). If the meeting ends early, the process proceeds to Step 420, where the meeting ends and communication is disconnected. If the meeting does not end early, then the process proceeds to Step 410.

In Step 410, the System notifies the attendee that the meeting is approaching its scheduled end time. In Step 412, the attendee decides whether he wants to extend the meeting beyond its scheduled end time. If the attendee wants to extend the meeting beyond its scheduled end time, the process proceeds to Step 414. If the attendee does not want to extend the meeting beyond its scheduled end time, then the process proceeds to Step 418, where communication with the meeting cuts off at the originally scheduled end time for the meeting. An example of the notification that the meeting is scheduled to end and of the option to extend the end time of a meeting, in accordance with one or more embodiments of the invention, is described in more detail below in relation to FIG. 8A.

In Step 414, after the attendee decides to extend the meeting beyond its scheduled end time, the System determines whether there is a conflict between the extended meeting and another item on the attendee's calendar. If another item on the attendee's calendar is in conflict with the extended meeting, then the process proceeds to Step 420. If there is no conflict between the extended meeting and another item on the attendee's calendar, then the process proceeds to Step 416, where the attendee remains in the extended meeting. When the meeting ends in Step 418, the communication ends, and the method for connecting to a meeting and managing conflicts that arise during the meeting is complete, ending the process. The meeting may end because it has ended early or because it has ended on time or because it was extended beyond its originally scheduled end time but was not in conflict with meeting on the attendee's calendar.

In Step 420, the System notifies the attendee that a conflict exists between the extended meeting and another item on the attendee's calendar. In Step 422, the System prompts the attendee to decide whether to start the second meeting at the scheduled start time for that second meeting. If the attendee decides to start the second meeting at its scheduled start time, then the process proceeds to Step 424. If the attendee decides to continue attending the extended meeting, then the process proceeds to Step 426. It is also possible that two different meetings were scheduled with some overlap, in which case the System notifies the attendee of the conflict before the start of the second meeting and prompts him to decide which meeting to participate in prior to the second meeting beginning. An example of notifying an attendee of a meeting conflict and presenting options to resolve the conflict in accordance with one or more embodiments of the invention is described in more detail below in relation to FIG. 8B.

In Step 424, the attendee has chosen to end the current meeting at its originally scheduled end time. This allows the attendee to attend the second meeting at its scheduled start time. The System then initiates attendance to the second meeting (Step 400). The second meeting then becomes the current meeting, and the process proceeds from Step 400 for the now-current meeting.

In Step 426, the attendee has chosen to extend the current meeting and delay attending the second meeting until the extended meeting ends in Step 428. The process then proceeds to Step 400, where the System initiates attendance to the second meeting. The second meeting then becomes the current meeting, and the process proceeds from Step 400 for the now-current meeting.

The following FIGS. 5-8B show examples in accordance with one or more embodiments of the invention. The examples are not intended to limit the scope of the invention.

Referring to FIG. 5, FIG. 5 shows an example, of a meeting template (500) in accordance with one or more embodiments of the invention. The meeting template includes: (i) a meeting date (502), which stores a meeting date; (ii) a meeting start time (504) field, which stores a meeting start time; (iii) a meeting end time (506) field, which stores a meeting end time; (iv) a subject of the meeting (508) field, which stores the subject of the meeting; (v) a meeting originator (510) field, which stores the originator of a meeting; (vi) a meeting call-in number (512) field, which stores the call-in number of a meeting; (vii) a meeting access code (514) field, which stores the meeting access code; (viii) a reminder (516) field, which stores the amount of time prior to the start time of a meeting that the attendee is notified of the meeting; (ix) a voice communication channel (518) field, which stores the voice communication channel to be used for the meeting; and (x) a stated name required (520) field, which stores whether a recording of the attendee's name is required for the meeting.

An example of a meeting template (500), shown in FIG. 5, incorporates information from a meeting notice (102), the general usage rules (112) and the voice communication channel usage rules (116), in accordance with one or more embodiments of the invention. One of ordinary skill in the art will appreciate that some or all of the fields may be listed in a different order, and some may be combined or omitted. Further, in one or more of the embodiments of the invention, one or more of the fields described below may be omitted, repeated, and/or presented differently. Still further, other fields related to a meeting (e.g., the contact number and email of the meeting originator, listing other scheduled meeting attendees) may be added to the meeting template (500). Accordingly, the specific arrangement of the meeting template (500) shown in FIG. 5 is for explanatory purposes only and should not be construed as limiting the scope of the invention.

The content for the meeting date (502) field is retrieved from the meeting notice (102) by the System and inserted into this field of the meeting template (110). In this example, the meeting date is Wednesday, Jul. 30, 2008. The meeting start time (504) field is retrieved from the meeting notice by the System and inserted into this field of the meeting template (110). In this example, the meeting start time is 9:30 a.m. Central Prevailing Time.

The content for the meeting end time (506) field is retrieved from the meeting notice (102) by the System and inserted into this field of the meeting template (110). In this example, the meeting end time is 10:00 a.m. Central Prevailing Time. The content for the subject of the meeting (508) field is retrieved from the meeting notice by the System and inserted into this field of the meeting template (110). In this example, the subject of the meeting is plumbing repairs.

The content for the name of the meeting originator (510) field is retrieved from the meeting notice (102) by the System and inserted into this field of the meeting template (110). The company for which the meeting originator represents may also be listed in this field. In this example, the meeting originator is Tom Tutone, who works for Gem Plumbing.

The content for the meeting call-in number (512) field is retrieved from the meeting notice (102) by the System and inserted into this field of the meeting template (110). The meeting call-in number (512) field stores the data to connect to a meeting, where such data may include, but is not limited to, a phone number, a link to a web site, or a link to a video conference. In this example, the meeting call-in number is 555-867-5309. The content for the meeting access code (514) field is retrieved from the meeting notice (102) by the System and inserted into this portion of the meeting template (110). In this example, the meeting access code is 53669. The meeting access code (514) field may be empty if no access code is required for a meeting.

The content for the reminder (516) field is the amount of time before the meeting start time that the System notifies the attendee of the meeting. This information may be retrieved from the general usage rules (112) or the voice communication channel usage rules (116), as established and revised from time to time by the attendee. In this example, the attendee has chosen to receive a meeting notice five minutes prior to the start time for the meeting. The reminder (516) field may be empty if the attendee chose not to receive a reminder. The voice communication channel (518) field displays the voice communication channel to be used for a meeting. In this example, the voice communication channel to be used for the meeting is the phone number 123-456-7890.

The stated name required (520) field indicates whether the attendee's name needs to be stated at the beginning of the meeting. This information may be provided by the attendee via the general usage rule(s) (112) or the voice communication channel usage rule(s) (116), by the information provided in the meeting notice (102), or by the System recognizing a channel or service previously used for a meeting and remembering the requirements for that prior meeting.

Figure 6:
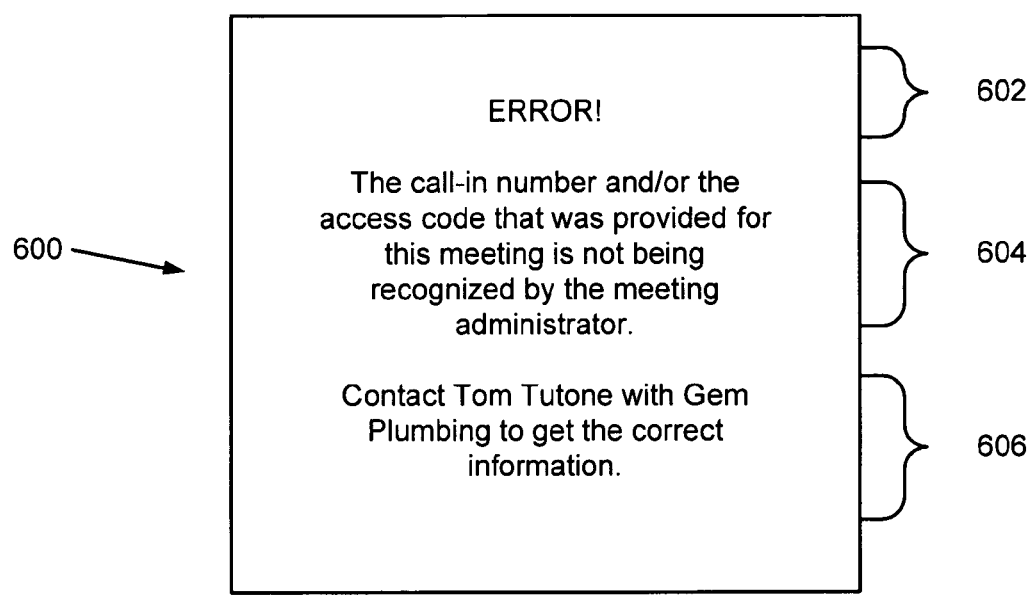
FIG. 6 shows an example of an error message to the attendee in accordance with one or more embodiments of the invention.

Referring to FIG. 6, FIG. 6 shows an example of an error message (600), in accordance with one or more embodiments of the invention. The error message (600) may includes: (i) an error statement (602) field, which states that an error has occurred; (ii) a description of the problem (604) field, which states the cause of the error; and (iii) a recommended action (606) field, which states a potential solution to the problem causing the error. In this case, the error message (600) relates to an error that occurs when the System is unable to establish voice communication with a meeting. This example is for explanatory purposes only and is not intended to limit the scope of the invention. Other messages may be shown, both for the circumstance of this example as well as for other events. In addition, there may be more or fewer parts to the message, and in a different order, than what is shown in this example.

The error statement (602) field of the error message (600) indicates that a problem has caused an error to occur. In this example, the word "ERROR!" appears in this field. Those skilled in the art will appreciate that other words (e.g., "WARNING") may be used to indicate a problem, and that other enhancements, such as flashing the warning message and adding sound, may be included.

The content in the description of the problem (604) field of the error message (600) describes the problem that the system encountered or provides other notification that needs to be conveyed to the attendee. In this example, the content in the description of the problem (604) field indicates that the System is unable to connect to a scheduled meeting because of an incorrect call-in number and/or an incorrect access code.

The content in the recommended action (606) field of the error message (600) provides a potential solution in resolving the problem that is causing the error. In this example, the recommended action (606) field indicates that Tom Tutone with Gem Plumbing, the originator of the meeting, is the person for the attendee to contact in order to get the correct data to connect to the meeting. Other information about the meeting related to resolving the problem that is causing the error, such as the phone number of the meeting originator, may be extracted from the meeting record (114) and incorporated into the recommended action (606) Those skilled in the art will appreciate that other information may be provided by the System to the attendee in this part of the message, such as the phone number for the contact.

Figure 7A:
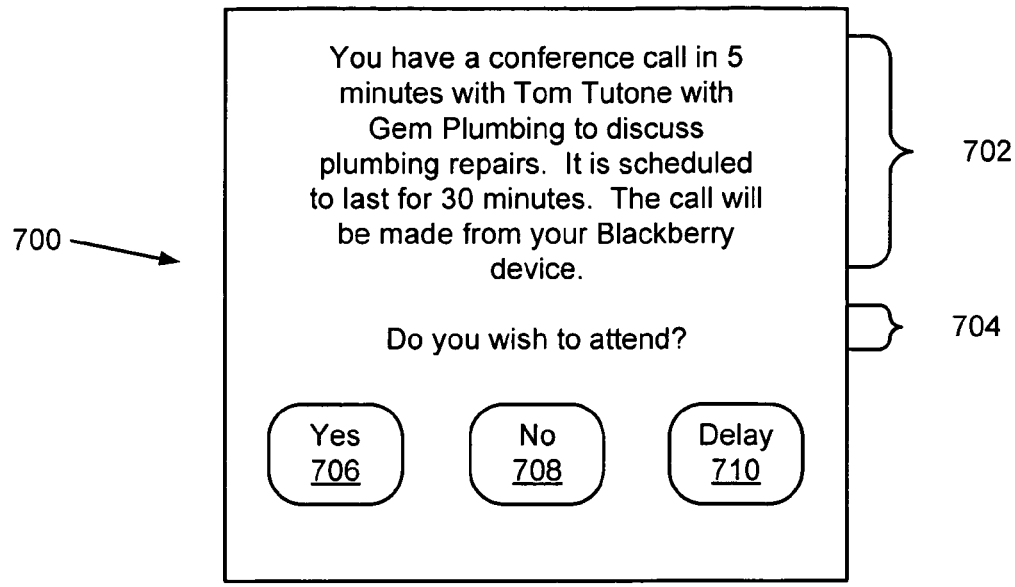
FIG. 7A shows an example of a meeting notification prior to the start of a meeting in accordance with one or more embodiments of the invention.

Referring to FIG. 7A, FIG. 7A shows an example of a meeting notification (700), in accordance with one or more embodiments of the invention. The meeting notification includes: (i) a notification message (702), which notifies the attendee of a pending meeting; (ii) an interrogatory message (704), which asks the attendee how the System should proceed; and (iii) a series of response options (706, 708, 710) from which the attendee chooses how to proceed with the pending meeting. This example is for explanatory purposes only and is not intended to limit the scope of the invention. Other messages and response options may be shown, both for the circumstance of this example as well as for other events. In addition, there may be more or fewer parts to the message or series of response options, and in different order, than what is shown in this example. There may also be multiple messages or response options to convey what this example shows.

The notification message (702) notifies the attendee that the meeting is beginning according to the notification period (Step 210) entered by the attendee in the user rules (112), which is now part of the meeting record (114) for that meeting. Other information about the meeting, such as the meeting originator, the scheduled duration of the meeting, the subject matter of the meeting, the type of meeting, and the voice communication channel that the attendee is using to participate in the meeting, may be extracted from the meeting record (114) and incorporated into the notification message (702).

The interrogatory message (704) requests the attendee to indicate how he would like to proceed. In this example, the interrogatory message (704) requests the attendee to indicate whether he wants to attend the meeting described in the notification message (702).

The series of response options (706, 708, 710) allows the attendee to answer the interrogatory message (704) by selecting one of the option in the series. In this case, the response options (706, 708, 710) are in the form of electronic pushbuttons, and they are: Yes (706), No (708), and Delay (710). If the attendee selects the "Yes" response option (706), then the System will attempt to connect to the meeting. If the attendee selects the "No" response option (708), then the System will not attempt to connect to the meeting. If the attendee selects the "Delay" response option (710), then the System will display a delay inquiry (712), as fully described in FIG. 7B. Those skilled in the art will appreciate that mechanisms other than electronic pushbuttons may be used to allow the attendee to enter his selection and that the wording of the response options may vary.

Figure 7B:
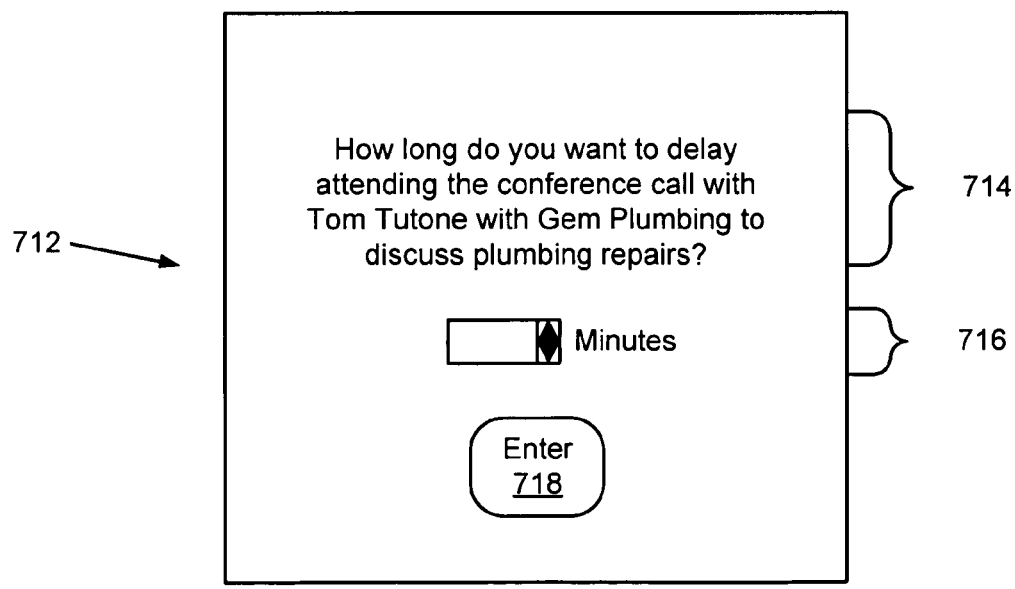
FIG. 7B shows an example of a prompt to delay a meeting in accordance with one or more embodiments of the invention.

Referring to FIG. 7B, FIG. 7B shows an example of a delay inquiry (712) in accordance with one or more embodiments of the invention. The delay inquiry (712) may include: (i) a delay message (714), which requests the attendee to indicate how long he wants to delay connecting to the meeting; (ii) a minutes (716) field, which stores the number of minutes that the attendee wants to delay connecting to the meeting; and (iii) an enter response pushbutton (718), which confirms the number of minutes that the attendee wants to delay attending the meeting. This example is for explanatory purposes only and is not intended to limit the scope of the invention. Other messages may be shown, both for the circumstance of this example as well as for other events. In addition, there may be more or fewer parts to the message, and in different order, than what is shown in this example.

The delay message (714) requests the attendee to indicate how long he would like to delay attending the meeting. The delay message (714) may include information about the meeting extracted from the meeting record (114). In this example, the delay message (714) includes the originator of the meeting and the subject matter of the meeting.

The minutes (716) field allows the attendee to specify how much time to delay the meeting. In this example, the minutes (716) field uses an electronic selection scroll to allow the attendee to choose how many minutes he would like to delay attending the meeting. Those skilled in the art will recognize that other units of time may be used in this situation, and that mechanisms other than an electronic selection scroll may be used to allow the attendee to select the amount of time to delay the meeting.

The enter response pushbutton (718) confirms the number of minutes that the attendee wants to delay attending the meeting. Once the attendee enters a number in the minutes (716) field select the number of minutes to delay attending the meeting, he may push the enter response pushbutton (718) to send his minutes (716) selection to the System. In this example, the enter response pushbutton (718) is an electronic pushbutton that says, "Enter." Those skilled in the art will recognize that other words or formats of the enter response pushbutton (718) may be used in this situation.

Figure 8A:
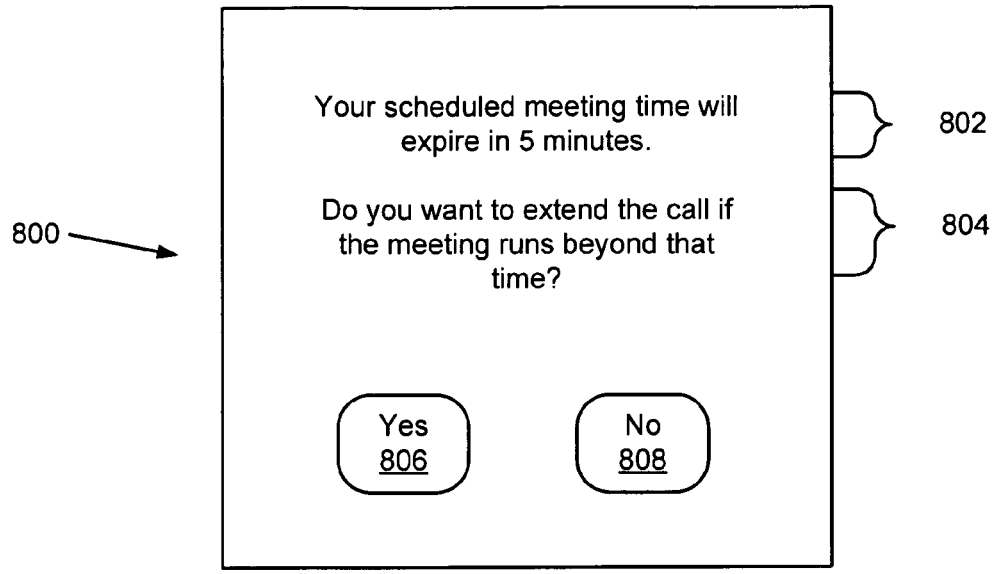
FIG. 8A shows an example of a prompt to extend a meeting in accordance with one or more embodiments of the invention.

Referring to FIG. 8A, FIG. 8A shows an example of a meeting extension notification (800) in accordance with one or more embodiments of the invention. The meeting extension notification (800) may include (i) a meeting expiration message (802), which notifies the attendee that the scheduled end of the meeting is approaching; (ii) a meeting extension inquiry (804), which asks the attendee if he wants to extend the call; and (iii) a set of meeting extension inquiry responses (806, 808), which allows the attendee to select an answer to the meeting extension inquiry (804). This example is for explanatory purposes only and is not intended to limit the scope of the invention. Other messages may be shown, both for the circumstance of this example as well as for other events. In addition, there may be more or fewer parts to the message, and in different order, than what is shown in this example. There may also be multiple messages to convey what this example shows.

The meeting expiration message (802) notifies the attendee that the scheduled end time of the meeting is approaching. The meeting expiration message (802) may extract and utilize information about the meeting from the meeting record (114). For example, the meeting expiration message (802) may extract the scheduled end time from the meeting notice (114), calculate the number of minutes until the meeting end time, and include this calculated number of minutes in the meeting expiration message (802). In this example, the meeting expiration message (802) notifies the attendee that the meeting is scheduled to expire in five minutes.

The meeting extension inquiry (804) requests the attendee to indicate whether he wants to extend the meeting if the meeting runs beyond its scheduled end time. The set of meeting extension inquiry responses (806, 808) allows the attendee to select an answer to the meeting extension inquiry (804). If the attendee selects the "Yes" meeting extension inquiry response (806), then the System will extend the end time of the meeting. If the attendee selects the "No" meeting extension inquiry response (808), then the System terminate communication with the meeting at the scheduled end time of the meeting. Those skilled in the art will appreciate that mechanisms other than electronic pushbuttons may be used to allow the attendee to enter his selection, and that other selections may be used to answer the meeting extension inquiry (804).

Figure 8B:
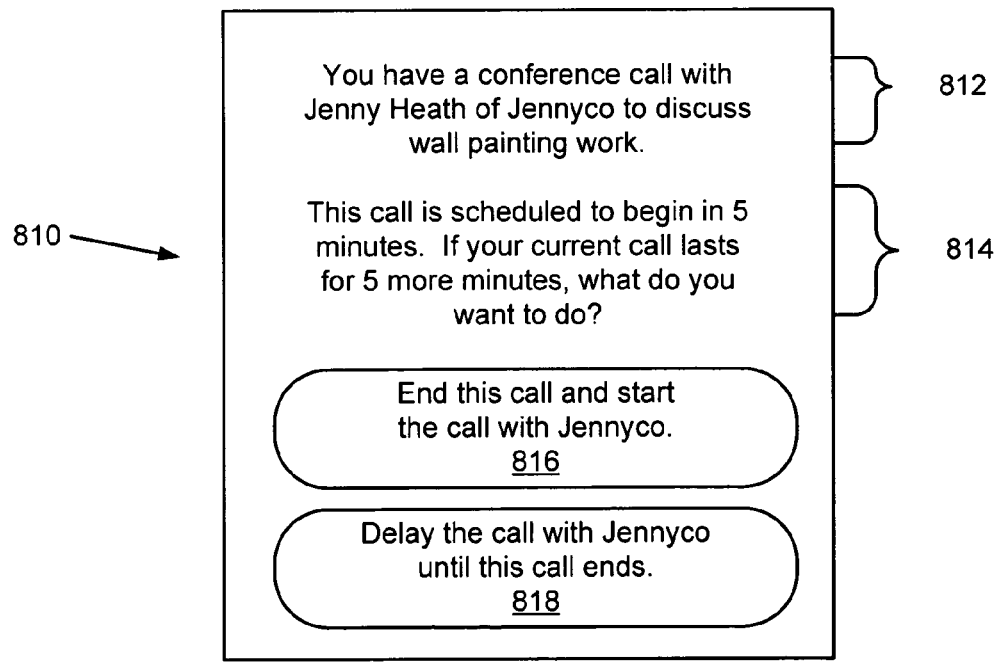
FIG. 8B shows an example of resolving a conflict that may arise during a meeting in accordance with one or more embodiments of the invention.

Referring to FIG. 8B, FIG. 8B shows an example of a meeting conflict notification (810) in accordance with one or more embodiments of the invention. The meeting conflict notification (810) may include: (i) a meeting conflict notification (812), which notifies the attendee that a meeting conflict exists; (ii) a meeting conflict resolution inquiry (814), which asks the attendee to determine which meeting to attend; (iii) an end current meeting response (816), which allows the attendee to end the current meeting and begin attending the other meeting that poses a conflict; and (iv) a remain in current meeting response (818), which allows the attendee to extend the current meeting and begin attending the other meeting when the current meeting ends. This example is for explanatory purposes only and is not intended to limit the scope of the invention. Other messages may be shown, both for the circumstance of this example as well as for other events. In addition, there may be more or fewer parts to the message, and in different order, than what is shown in this example. There may also be multiple messages to convey what this example shows.

The meeting conflict notification (812) notifies the attendee that the meeting the attendee is currently attending is about to conflict with the start time of another meeting. The System may extract information from the meeting record (114) and incorporate that information into the meeting conflict notification (812). In this example, the meeting conflict notification (812) includes the originator and subject matter of the pending meeting, as extracted from the meeting record (114) for that meeting.

The meeting conflict resolution inquiry (814) requests the attendee to indicate which meeting to attend. The meeting System may extract information from the meeting record (114) for both the current meeting and for the meeting posing a conflict, incorporating that information into the meeting conflict notification (812). In this example, the meeting conflict resolution inquiry (814) states that the next meeting starts in five minutes and prompts the attendee about what he wants to do at that time.

In this example, there are two responses to the meeting conflict resolution inquiry (814). The end current meeting response (816) ends the current meeting at its original end time and connects to the other meeting. The remain in current meeting response (818) delays connecting to the next meeting until the current meeting ends, even if the current meeting runs beyond its scheduled end time. Those skilled in the art will appreciate that mechanisms other than electronic pushbuttons may be used to allow the attendee to enter his selection, and that different options and different wording may be used to resolve a meeting conflict.

Figure 9:
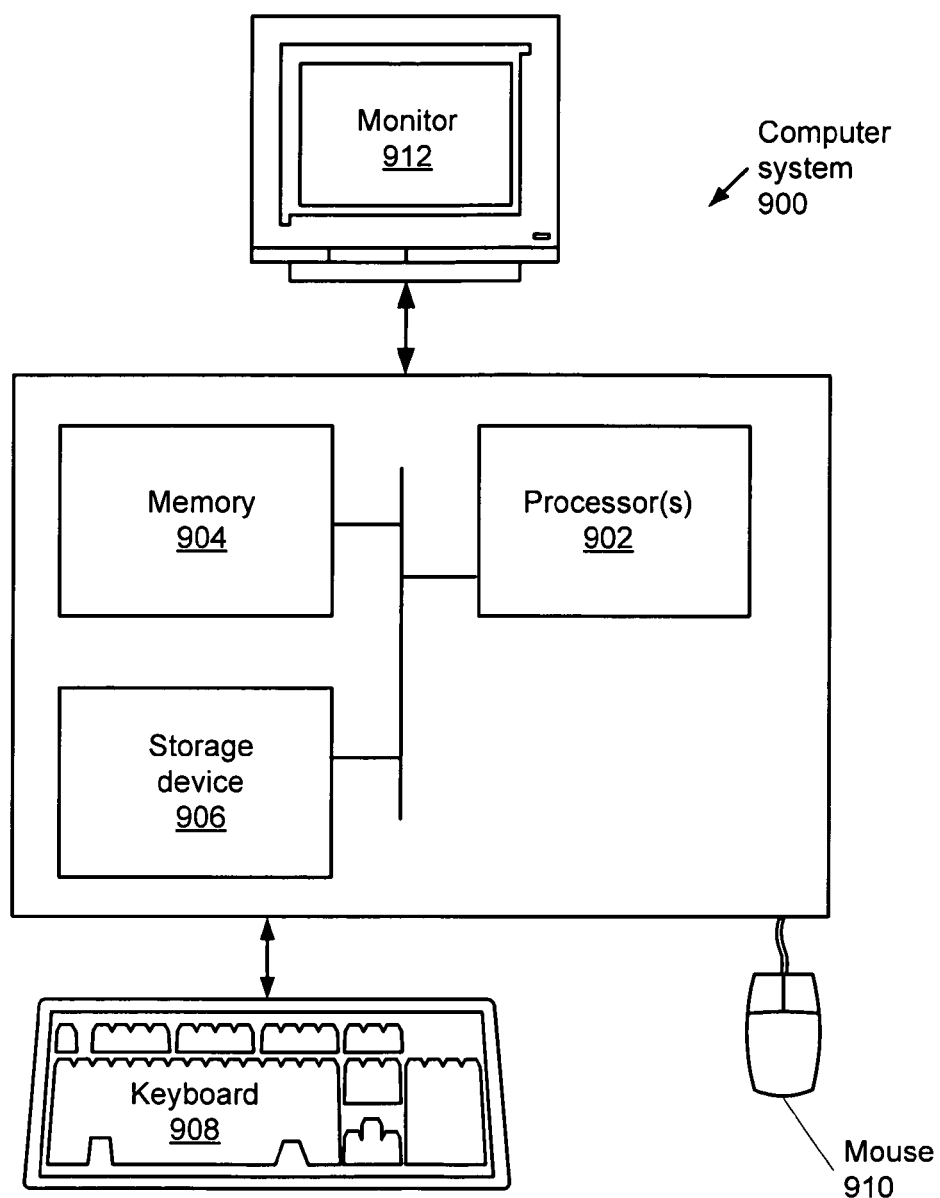
FIG. 9 shows a computer system in accordance with one or more embodiments of the invention.

Embodiments of the invention may be implemented on virtually any type of computer regardless of the platform being used. For example, as shown in FIG. 9, a computer system (900) includes one or more processor(s) (902), associated memory (904) (e.g., random access memory (RAM), cache memory, flash memory, etc.), a storage device (906) (e.g., a hard disk, an optical drive such as a compact disk drive or digital video disk (DVD) drive, a flash memory stick, etc.), and numerous other elements and functionalities typical of today's computers (not shown). The computer (900) may also include input means, such as a keyboard (908), a mouse (910), or a microphone (not shown). Further, the computer (900) may include output means, such as a monitor (912) (e.g., a liquid crystal display (LCD), a plasma display, or cathode ray tube (CRT) monitor). The computer system (900) may be connected to a network (914) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (900) includes at least the minimal processing, input, and/or output means necessary to practice embodiments of the invention.

Further, those skilled in the art will appreciate that one or more elements of the aforementioned computer system (900) may be located at a remote location and connected to the other elements over a network. Further, embodiments of the invention may be implemented on a distributed system having a plurality of nodes, where each portion of the invention (e.g., the System, voice communication channel interface (106)) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, or any other computer readable storage device.

While the invention has been described with respect to a limited number of embodiments, those skilled in the art, having benefit of this disclosure, will appreciate that other embodiments may be devised which do not depart from the scope of the invention as disclosed herein. Accordingly, the scope of the invention should be limited only by the attached claims.

What is claimed is:

1. A method for attending a meeting, comprising:
   determining, on a computer processor, the presence of a first meeting notice for a first meeting in meeting software, wherein the first meeting notice comprises a first start time, a first end time, a name of an attendee, and information to connect to the first meeting;
   obtaining, on the computer processor, information about the first meeting from the first meeting notice to populate a meeting template;
   determining, on the computer processor, that the first meeting is a not-in-person meeting requiring a first call-in number to attend;
   populating, on the computer processor, the meeting template to obtain a first meeting record for the first meeting;
   connecting, on the computer processor and using the first call-in number, over a voice communication channel to the first meeting at the first start time using the information in the first meeting record for the first meeting;

notifying, during the first meeting, the attendee prior to the first end time of the first meeting of the amount of time remaining before the first end time of the first meeting;

receiving, during the first meeting, a response from the attendee to extend the first end time of the first meeting to a second end time of the first meeting;

notifying, during the first meeting and based on the response, the attendee of a conflict between the second end time of the first meeting and the first start time of a second meeting;

receiving, from the attendee during the first meeting, a confirmation to extend the first end time of the first meeting to the second end time;

connecting, based on the confirmation from the attendee, to the second meeting after the second end time of the first meeting by calling a second call-in number and using an access code;

receiving an indication that the second call-in number and the access code are incorrect for connecting to the second meeting;

retrieving a phone number of a meeting originator of the second meeting from a second meeting notice; and presenting, in response to the indication, an error message recommending the attendee to contact the meeting originator using the phone number.

2. The method of claim 1, further comprising:
notifying the attendee prior to the first start time of the first meeting; and
receiving a response from the attendee to confirm attendance of the first meeting.

3. The method of claim 2, further comprising:
receiving a response from the attendee to delay connecting to the first meeting by an amount of time after the first start time.

4. The method of claim 1, further comprising:
after populating the first meeting record for the first meeting:
  displaying the first meeting record for the first meeting for review by the attendee; and
  receiving any corrections made to the first meeting record for the first meeting by the attendee, creating a second meeting record for the first meeting.

5. The method of claim 1, further comprising:
providing a recording of the name of the attendee while connecting to the first meeting.

6. The method of claim 1, wherein connecting over the voice communication channel to the first meeting comprises providing an access code after the first call-in number has been dialed.

7. The method of claim 1, wherein the meeting template comprises a first meeting date, the first start time, the first end time, a subject matter of the first meeting, a first meeting originator, data to connect to the first meeting, an access code for the first meeting, a reminder prior to the first meeting, the voice communication channel, and an option to state the name of the attendee.

8. The method of claim 1, wherein populating the meeting template comprises using a usage rule to select the voice communication channel from a plurality of voice communication channels, wherein the first meeting record comprises a voice communication channel selection.

9. A non-transitory computer readable medium comprising computer program code embodied therein for attending a meeting, the computer program code comprising instructions to:

determine the presence of a first meeting notice for a first meeting in meeting software, wherein the first meeting notice comprises a first start time, a first end time, a name of an attendee, and information to connect to the first meeting;

obtain information about the first meeting from the first meeting notice to populate a meeting template;

determine that the first meeting is a not-in-person meeting requiring a call-in number to attend;

populate the meeting template to obtain a first meeting record for the first meeting;

connect, using the first call-in number, over a voice communication channel to the first meeting at the first start time using the information in the first meeting record for the first meeting;

notify, during the first meeting and based on the response, the attendee of a conflict between the second end time of the first meeting and the first start time of a second meeting;

receive, from the attendee during the first meeting, a confirmation to extend the first end time of the first meeting to the second end time;

connect, based on the confirmation from the attendee, to the second meeting after the second end time of the first meeting by calling a second call-in number and using an access code;

receive an indication that the second call-in number and the access code are incorrect for connecting to the second meeting;

retrieve a phone number of a meeting originator of the second meeting from a second meeting notice; and present, in response to the indication, an error message recommending the attendee to contact the meeting originator using the phone number.

10. The non-transitory computer readable medium of claim 9, further comprising computer readable instructions to:
notify the attendee prior to the first start time of the first meeting; and
receive a response from the attendee to confirm attendance of the first meeting.

11. The non-transitory computer readable medium of claim 10, further comprising computer readable instructions to:
receive a response from the attendee to delay connecting to the first meeting by an amount of time after the first start time.

12. The non-transitory computer readable medium of claim 9, further comprising computer readable instructions to:
after populating the first meeting record for the first meeting:
  display the first meeting record for the first meeting for review by the attendee; and
  receive any corrections made to the first meeting record for the first meeting by the attendee, creating a second meeting record for the first meeting.

13. The non-transitory computer readable medium of claim 10, further comprising computer readable instructions to:
provide a recording of the name of the attendee while connecting to the first meeting.

14. The non-transitory computer readable medium of claim 9, wherein connecting over the voice communication channel to the first meeting comprises providing an access code after the first call-in number has been dialed.

15. The non-transitory computer readable medium of claim 9, wherein the meeting template comprises a first meeting date, the first start time, the first end time, a subject matter of the first meeting, a first meeting originator, data to connect to the first meeting, an access code for the first meeting, a reminder prior to the first meeting, the voice communication channel, and an option to state the name of the attendee.

16. The non-transitory computer readable medium of claim 9, wherein populating the meeting template comprises using a usage rule to select the voice communication channel from a plurality of voice communication channels, wherein the first meeting record comprises a voice communication channel selection.

17. A system for automatically connecting to a meeting, comprising:
   a computer processor;
   meeting software configured to:
      send and receive meeting notices;
   an automated meeting attendance system operatively connected to the meeting software and executing on the computer processor, wherein the automated meeting attendance system is configured to:
      determine presence of a first meeting notice for a first meeting in meeting software, wherein the first meeting notice comprises a first start time, a first end time, a name of an attendee, and information to connect to the first meeting;
      obtain information about the first meeting from the first meeting notice to populate a first meeting template;
      determine that the first meeting is a not-in-person meeting requiring a call-in number to attend;
      populate the meeting template to obtain a first meeting record for the first meeting;
      connect, using a first call-in number, over a voice communication channel to the first meeting at the first start time using the information in the first meeting record for the first meeting;
      notify, during the first meeting and based on the response, the attendee of a conflict between the second end time of the first meeting and the first start time of a second meeting;
      receive, from the attendee during the first meeting, a confirmation to extend the first end time of the first meeting to the second end time;
      connect, based on the confirmation from the attendee, to the second meeting after the second end time of the first meeting by calling a second call-in number and using an access code;
      receive an indication that the second call-in number and the access code are incorrect for connecting to the second meeting;
      retrieve a phone number of a meeting originator of the second meeting from a second meeting notice; and
      present, in response to the indication, an error message recommending the attendee to contact the meeting originator using the phone number.

18. The system of claim 17, wherein the automated meeting attendance system is further configured to:
   notify the attendee prior to the first start time of the first meeting; and
   receive a response from the attendee to confirm attendance of the first meeting.

19. The system of claim 17, wherein the automated meeting attendance system is further configured to:
   receive a response from the attendee to delay connecting to the first meeting by an amount of time after the first start time.

* * * * *